United States Patent [19]

Nixon

[11] Patent Number: 4,475,791

[45] Date of Patent: Oct. 9, 1984

[54] DISPLAY ARRANGEMENTS

[75] Inventor: Ralph D. Nixon, Braintree, England

[73] Assignee: English Electric Valve Company Limited, Chelmsford, England

[21] Appl. No.: 444,219

[22] Filed: Nov. 24, 1982

[30] Foreign Application Priority Data

Nov. 26, 1981 [GB] United Kingdom ................. 8135706

[51] Int. Cl.[3] ...................... G49F 13/14; G49F 13/76; G03B 21/60

[52] U.S. Cl. ...................................... 350/127; 40/451; 40/456; 350/128; 350/129; 350/286; 362/298; 362/301; 362/346

[58] Field of Search ................. 40/541, 448, 546, 549, 40/451; 350/128, 286, 127, 129; 362/298, 301, 339, 346

[56] References Cited

U.S. PATENT DOCUMENTS 3,791,712 2/1974 Miyagi ................................ 350/128
3,830,556 8/1974 Bratkowski ......................... 350/167
3,947,091 3/1976 Treka .................................... 40/448
4,058,919 11/1977 Wakabayashi ........................ 40/451

*Primary Examiner*—Bruce Y. Arnold
*Assistant Examiner*—William Propp
*Attorney, Agent, or Firm*—Kenyon & Kenyon

[57] ABSTRACT

A display arrangement consists of one or more elongate display devices, each of which has a number of separately energizable display areas positioned along its length. When energized, each display area is seen as a bright patch of light. As it is very difficult to arrange that the display areas extend right to the extreme ends of the device, optical deflection means are positioned in front of the display areas to magnify the size of each so that the total display area extends over the whole length of the elongate display device. The optical deflection means is arranged so that each bright patch is of substantially the same size. The invention enables a large number of similar elongate display devices to be placed end to end while avoiding the appearance of periodic dark patches at the ends of adjacent devices.

15 Claims, 4 Drawing Figures

DISPLAY ARRANGEMENTS

This invention relates to display arrangements and in particular is concerned with display arrangements which include one or more display devices which are capable of providing a very bright display in an adaptive manner. The need can arise for very large display arrangements in which the information presented to an observer can be altered rapidly and in a very versatile manner. U.S. Pat. No. 4,387,322 discloses an elongate display device having a plurality of separately energisable display areas positioned along its length, and these display areas are positioned at regular intervals so that when a number of these devices are placed end to end a uniformly regular array of bright patches can be provided. In order to increase the overall illumination from the device, each bright patch is placed as close as possible to the adjacent bright patch on each side of it. To preserve the uniform regularity it is thus necessary to position display patches very close indeed to the ends of the individual display devices. This requirement results in some additional complexity, and increases the cost of manufacture. The present invention seeks to provide an improved display arrangement in which this particular difficulty does not arise.

According to this invention, a display arrangement includes an elongate display device having a plurality of separately energisable display areas positioned along its length, but which do not extend right to the ends of the elongate display device; and optical deflection means positioned in front of the display device to magnify the size of each display area so that the total display area of the arrangement extends over the whole length of the elongate display device.

When a number of these display devices are placed end to end, the provision of the optical deflection means avoids the appearance of dark patches at periodic intervals corresponding to the lengths of the individual devices.

The optical deflection means can take the form of inclined reflectors mounted at the ends of each individual display area so as to project forwards therefrom, the individual angles of inclination determining the degree of magnification provided. Alternatively, the optical deflection means can take the form of refractors positioned a short distance in front of the surface of the individual display areas. The refractors can conveniently be in the form of a prismatic wedge shape, but alternative shapes are possible.

A large number of the elongate display devices can be placed end to end in a row to form an elongate array. To produce a two dimensional array surface, a number of these rows can be placed side by side so as to form in effect a matrix of display areas arranged in columns and rows. In this case, the optical deflection means can conveniently be common to all columns. This aspect considerably enhances the ease with which the optical deflection means can be mounted on a very large two dimensional display arrangement.

Figure 1:
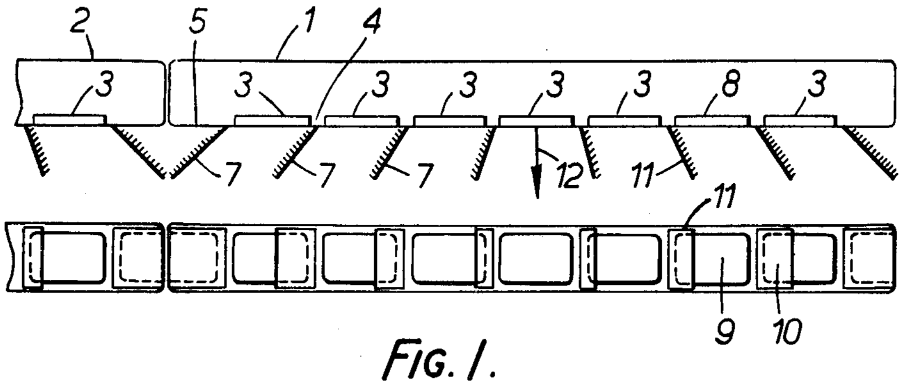
Figure 2:
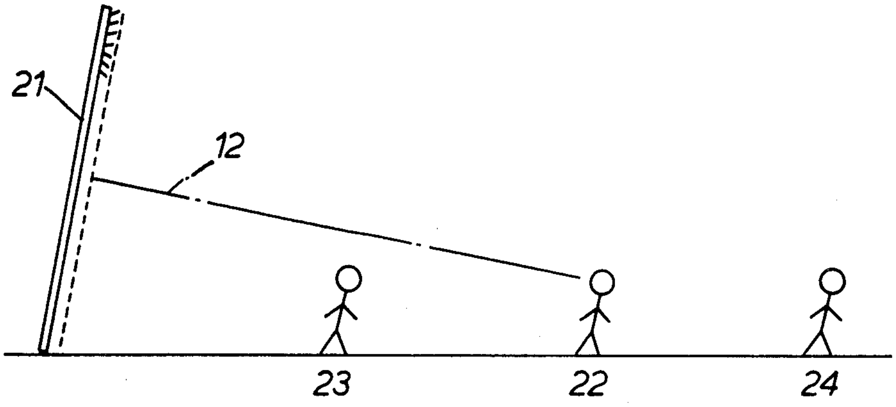
Figure 3:
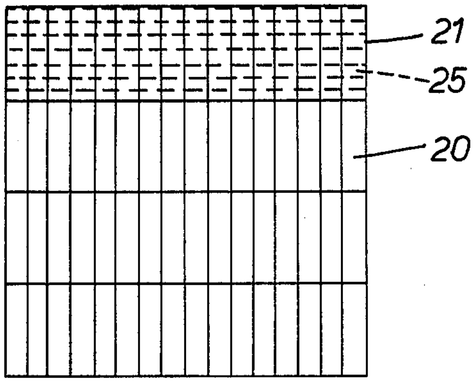
Figure 4:
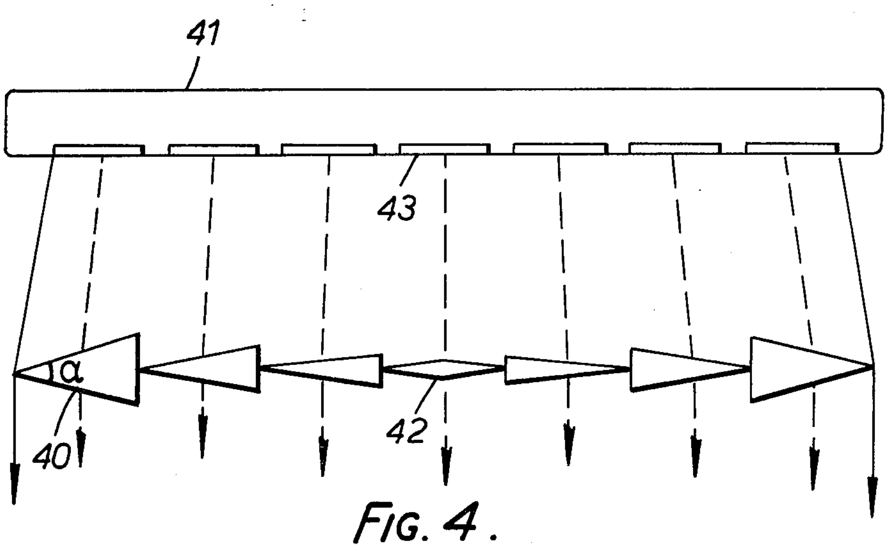

The invention is further described by way of example with reference to the accompanying drawings in which, FIG. 1 shows plan and elevation views of a display arrangement in accordance with the invention, FIG. 2 shows a display arrangement mounted so as to be conveniently viewed by an observer, FIG. 3 shows a large two dimensional array and FIG. 4 shows an alternative display arrangement utilizing optical refractors in the form of prisms.

Referring to FIG. 1, two display devices forming part of a display arrangement are illustrated. Two display devices 1 and 2 are placed end to end and each device is of an elongate shape having seven separately energisable display areas 3. Each device area, when energised, is simply illuminated to present a patch of light to an observer. All patches may be of the same colour or alternatively a sequence of colours such as red, blue, green can be provided in a repeating pattern so as to enable any colour of the spectrum to be synthesised in the conventional manner. In use, it is proposed that a very large number of display devices will be assembled into a single two dimensional display arrangement with observers being located sufficiently far from the display arrangement such that individual display areas cannot be separately resolved. Thus the display arrangement can be used to project a very large picture or the like in monochrome or in colour.

Each display device can take the general form illustrated in the above mentioned patent, but modified so that the individual display areas do not extend right to the ends of the device. Briefly, the display device 1 (or 2) consists of an evacuated glass envelope having a wire filament extending along its length. The wire filament is a cathode which when heated, emits electrons copiously towards a display surface consisting of fluorescent material. The fluorescent material glows very brightly when the electrons fall upon it, and mesh electrodes are positioned immediately in front of each localised area so as to control the passage of electrons to the fluorescent surface. In practice, the fluorescent surface may be continuous, in which case the individual patches are defined by the mesh electrodes themselves.

It will be seen from FIG. 1 that each display device consists of seven individual display areas 3 which are spaced apart from each other by a very small distance 4, but relatively large distances 5 are provided between the ends of the display device and the display area 3 which is most closely adjacent to it i.e. the terminal display area 3. Thus if a large number of the display devices are placed end to end a permanent dark patch will inevitably appear at the points where adjacent display devices abut against each other. In a large two dimensional array the appearance of such dark patches is clearly undesirable, even if they are positioned randomly throughout the display.

The invention enables the effective area of the display areas 3 to be increased so that together they extend over the whole length of the display device. In FIG. 1 optical deflection means, such as deflectors take the form of mirrors 7 which reflect the light emitted by the display areas 3. The lower drawing in FIG. 1 shows the view presented to an observer. Considering an individual display area 8, part 9 of it is seen directly, and part 10 of it is seen by reflection. Clearly part of the display area 8 is observed by the adjacent mirror 11 i.e. obscured from view by the observer, but overall the effective area of view as seen by an observer is increased. The inclination of each of the mirrors 7 is varied across the length of each display device 1, 2, so that the outer edges of the end most mirrors align with the physical ends of the housing of the device. The inclination of the mirrors is shown, so that as viewed by an observer, the effective area of all bright patches are the same.

The presence of the mirrors 7 will not cause material distortion of the display provided that it is viewed from a direction which is not displaced too far from the optical axis 12 of the display. This condition can be most readily satisfied by mounting the display devices in an upright manner. Such an arrangement is shown in FIGS. 2 and 3, and a large number of individual devices 20 are arranged in vertical columns and horizontal rows to form a two dimensional display 21. In practice a very much larger number of devices would be provided, but the number illustrated has been restricted for the sake of clarity. The ideal viewing position is represented by an observer 22—the display 20 is inclined forwards slightly so that the observer 22 is on the optical axis 12, and at such a distance from the display itself so that each individual display area is resolvable only as a patch of light.

The acceptable viewing angle is somewhat restricted in the vertical plane, but observers 23, 24 positioned some way in front of and behind the observer 22 receive a satisfactory view of the display. No such angular viewing restriction is presented in the horizontal plane, where viewing angles are only dependent on the nature of the display devices themselves, and not on the optical deflectors.

The mirrors extend across all of the columns of the display structure 21 in a continuous manner, and this avoids the need to individually mount a very large number of small mirrors at precise angles. The elongate strips of mirrors are represented by the broken lines 25.

An alternative form of optical deflector is shown in FIG. 4, in which optical refractors 40 are mounted in front of a display device 41. Each refractor is in the form of an optically transmissive prism having an angle $\alpha$ which determines the extent of the deflection imparted to light passing through it with the terminal refractors deflecting the light towards a respective end of a display device 41. The central refractor 42 is formed as two prisms as shown, since whilst the overall position of the central display area 43 is not affected, its effective size is magnified by the two prisms.

The refractors can be produced in the form of a large moulding which extends across the entire width of a large display which consists of a very large number of individual display devices, of the kind shown in FIG. 3.

The invention enables a display of great size and brightness to be presented to a large audience. The optical deflectors permit pictures and scenes of a high quality to be seen from a distance.

Whether the optical deflectors take the form of the reflectors or the refractors, the front surface of the structure can be covered with a smooth sheet of optically transparent material to exclude dirt and rain etc.—this may be necessary if the display is used in the open air. This front cover is spaced apart from the display areas by a distance which is dictated by the size of the optical deflection means. It may be advantageous in the case of the refractors to form them as an integral part of the front cover in a moulding operation.

I claim:

1. A display arrangement including an elongate display device having a plurality of separately energisable display areas positioned along the length of said elongate display device and spaced from the ends of said elongate display device; and optical deflection means positioned in front of said elongate display device to magnify the size of each display area so that the total display area of the arrangement extends over the whole length of said elongate display device.

2. A display arrangement as claimed in claim 1 wherein said optical deflection means magnify each display area by a similar amount so that the effective size of all areas, as seen by an observer, are the same.

3. A display arrangement as claimed in claim 1 further including a plurality of elongate display devices positioned side-by-side with said optical deflection means being common to said devices.

4. A display arrangement as claimed in claim 1 wherein said optical deflection means takes the form of a plurality of inclined reflectors mounted at the ends of each individual display area so as to project forwards therefrom, the individual angles of inclination determining the degree of magnification provided.

5. A display arrangement as claimed in claim 4 wherein each said reflector is a flat plane mirror.

6. A display arrangement as claimed in claim 1 wherein said optical deflection means takes the form of a plurality of refractors.

7. A display arrangement as claimed in claim 6 wherein each said refractor is in the shape of a prismatic wedge.

8. A display arrangement as claimed in claim 1 further including an outer, smooth, optically transmissive surface spaced apart from and in front of said display areas.

9. A display arrangement comprising a plurality of display devices of elongate shape disposed in end-to-end relation, each said display device including a plurality of spaced apart energisable display areas for presenting patches of light, each terminal display area being spaced from an end of a respective display device; and a plurality of optical deflectors, at least one of said optical deflectors being disposed between an end of a display device and a terminal display area thereof to reflect part of the light emitted from said respective terminal display area whereby part of said respective terminal area is viewed by reflection from said respective deflector to increase the effective area of each said terminal display area.

10. A display arrangement as set forth in claim 9 wherein each said deflector is a mirror having an edge aligned with an end of a respective display device.

11. A display arrangement as set forth in claim 9 wherein an optical deflector is disposed adjacent each of said display areas to reflect part of the light emitted therefrom.

12. A display arrangement as set forth in claim 11 wherein said deflectors are mirrors inclined to a given optical axis to produce equal effective areas of view of said display areas.

13. A display arrangement comprising a plurality of display devices of elongate shape disposed in end-to-end relation, each said display device including a plurality of spaced apart energisable display areas for presenting patches of light, each terminal display area being spaced from an end of a respective display device; and optical refractors disposed in front of at least said terminal display areas of adjacent display devices, each refractor being positioned to deflect light emitted from a respective terminal display area towards a respective end of a respective display device.

14. A display arrangement as set forth in claim 13 further comprising a central refractor in the form of two prisms to magnify the effective size of a central display area.

15. A display arrangement as set forth in claim 13 wherein each refractor is an optically transmissive prism.

* * * * *